United States Patent
Franklin et al.

(10) Patent No.: US 10,097,988 B2
(45) Date of Patent: Oct. 9, 2018

(54) APPARATUS AND METHOD FOR MANAGING MOBILITY IN A WIRELESS COMMUNICATION SYSTEM

(71) Applicant: Samsung Electronics Co., Ltd., Suwon-si, Gyeonggi-do (KR)

(72) Inventors: Antony Franklin, Suwon-si (KR); Ki-Suk Kweon, Suwon-si (KR); Jung-Shin Park, Seoul (KR); Yeong-Moon Son, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 128 days.

(21) Appl. No.: 14/097,851

(22) Filed: Dec. 5, 2013

(65) Prior Publication Data

US 2014/0169335 A1 Jun. 19, 2014

(30) Foreign Application Priority Data

Dec. 14, 2012 (KR) ........................ 10-2012-0146592

(51) Int. Cl.
| | | |
|---|---|---|
| G01R 31/08 | (2006.01) | |
| H04L 12/28 | (2006.01) | |
| H04L 5/14 | (2006.01) | |
| H04J 3/00 | (2006.01) | |
| H04W 8/08 | (2009.01) | |
| H04J 11/00 | (2006.01) | |
| H04W 72/12 | (2009.01) | |
| H04W 84/10 | (2009.01) | |

(52) U.S. Cl.
CPC ............ *H04W 8/082* (2013.01); *H04J 11/005* (2013.01); *H04J 11/0023* (2013.01); *H04J 11/0053* (2013.01); *H04J 11/0056* (2013.01); *H04W 72/1278* (2013.01); *H04W 84/10* (2013.01)

(58) Field of Classification Search
CPC ..... H04W 8/082; H04J 11/0023; H04J 11/005
See application file for complete search history.

(56) References Cited

U.S. PATENT DOCUMENTS

| 5,905,955 A * | 5/1999 | Bamburak ............ H04W 48/18 |
|---|---|---|
| | | 455/434 |
| 7,046,486 B1 * | 5/2006 | Coffey ................. G11B 5/5552 |
| | | 360/245.3 |

(Continued)

FOREIGN PATENT DOCUMENTS

| KR | 10-2012-0125505 A | 11/2012 |
|---|---|---|
| WO | 2010079933 A2 | 7/2010 |

(Continued)

*Primary Examiner* — Abu-Sayeed Haque
(74) *Attorney, Agent, or Firm* — Jefferson IP Law, LLP

(57) ABSTRACT

Mobility management in a wireless communication system supporting a Base Station set is provided. The system includes a plurality of BSs directly connected to the Internet without an upper node, and configured to provide wireless access to at least one Mobile Station (MS). The BSs construct a cloud cell for providing service to the at least one MS, and a first BS of the plurality of BSs functions as a control master and is configured to perform control signaling with the at least one MS, and a second BS of the plurality of BSs functions as a data master and is configured to perform scheduling for service provision through the cloud cell and to operate as an Internet Protocol (IP) endpoint of the at least one MS.

20 Claims, 14 Drawing Sheets

(56) References Cited

U.S. PATENT DOCUMENTS

| | | | |
|---|---|---|---|
| 8,331,308 B1 | 12/2012 | Au et al. | |
| 2005/0111484 A1* | 5/2005 | Obata | H04W 88/08 370/465 |
| 2008/0165776 A1* | 7/2008 | Tao | H04B 7/2606 370/392 |
| 2008/0186933 A1* | 8/2008 | Willman | H04W 88/02 370/338 |
| 2009/0323533 A1* | 12/2009 | Ohta | H04W 36/02 370/236 |
| 2010/0011231 A1* | 1/2010 | Banerjea | H04W 52/0251 713/320 |
| 2010/0046427 A1* | 2/2010 | Li | H04B 7/0686 370/328 |
| 2010/0097965 A1* | 4/2010 | Kwon | H04L 5/14 370/294 |
| 2010/0099401 A1 | 4/2010 | Bishop | |
| 2010/0322128 A1* | 12/2010 | Becker | H04W 4/08 370/312 |
| 2011/0222460 A1* | 9/2011 | Fahldieck | H04L 5/0023 370/312 |
| 2011/0243085 A1 | 10/2011 | Seo et al. | |
| 2011/0244868 A1 | 10/2011 | Senarath et al. | |
| 2011/0249609 A1* | 10/2011 | Brusilovsky | H04B 7/15521 370/315 |
| 2011/0255526 A1* | 10/2011 | Kaneko | H04B 7/022 370/338 |
| 2011/0305195 A1* | 12/2011 | Forck | H04B 7/022 370/328 |
| 2012/0069917 A1 | 3/2012 | Liu et al. | |
| 2012/0176987 A1* | 7/2012 | Kaminski | H04L 5/0053 370/329 |
| 2012/0184322 A1* | 7/2012 | Falconetti | H04W 28/18 455/524 |
| 2012/0236749 A1 | 9/2012 | Marinier et al. | |
| 2012/0270553 A1* | 10/2012 | Ha | H04W 36/22 455/438 |
| 2013/0040625 A1 | 2/2013 | Godin et al. | |
| 2013/0065622 A1* | 3/2013 | Hwang | H04W 16/28 455/500 |
| 2013/0090128 A1* | 4/2013 | Sawamoto | H04W 24/02 455/452.2 |
| 2013/0250864 A1* | 9/2013 | Zhang | H04W 72/042 370/329 |
| 2013/0272277 A1* | 10/2013 | Suwa | H04W 56/0015 370/336 |
| 2013/0287001 A1* | 10/2013 | Sahlin | H04W 72/0426 370/330 |
| 2013/0337811 A1* | 12/2013 | Faerber | H04W 36/0072 455/436 |
| 2014/0024375 A1* | 1/2014 | Fitzpatrick | H04W 36/0083 455/436 |
| 2014/0029506 A1* | 1/2014 | Sahin | H04J 11/0053 370/315 |
| 2014/0050095 A1* | 2/2014 | Szilagyi | H04L 1/0002 370/236 |
| 2014/0098670 A1* | 4/2014 | Choi | H04L 5/00 370/235 |
| 2014/0120967 A1* | 5/2014 | Purnadi | H04W 72/1226 455/501 |
| 2014/0286298 A1* | 9/2014 | Yoshimoto | H04B 7/024 370/329 |
| 2014/0370896 A1* | 12/2014 | Ganapathy | H04W 28/08 455/436 |

FOREIGN PATENT DOCUMENTS

| | | |
|---|---|---|
| WO | 2010/137155 A1 | 12/2010 |
| WO | 2011151857 A1 | 12/2011 |
| WO | 2012/000161 A1 | 1/2012 |
| WO | 2013/073869 A1 | 5/2013 |

* cited by examiner

APPARATUS AND METHOD FOR MANAGING MOBILITY IN A WIRELESS COMMUNICATION SYSTEM

CROSS-REFERENCE TO RELATED APPLICATION(S)

This application claims the benefit under 35 U.S.C. § 119(a) of a Korean patent application filed on Dec. 14, 2012 in the Korean Intellectual Property Office and assigned Serial No. 10-2012-0146592, the entire disclosure of which is hereby incorporated by reference.

TECHNICAL FIELD

The present disclosure relates to an apparatus and a method for efficiently managing mobility of a Mobile Station (MS) in a wireless communication system.

BACKGROUND

A next-generation wireless communication system is considering the use of a high-frequency band, such as a millimeter wave, to support a large-capacity data service. However, if the next-generation wireless communication system uses the high-frequency band, such as the millimeter wave, a communication distance between a Mobile Station (MS) and a Base Station (BS) is decreased as compared to a legacy wireless communication system.

The decrease of the communication distance leads to a decrease of a cell radius of the BS. Accordingly, the number of BSs installed to provide a service area of the MS must be increased. Moreover, the decrease of the cell radius and the increase of the number of BSs lead to an increase in handover when the MS moves, thereby increasing the consumption of system resources.

In addition, the increase of the number of BSs increases processing capacity of an access gateway. Accordingly, it is not desirable to apply a centralized network structure in a small cell environment.

Accordingly, to decrease consumption of system resources and processing capacity, a need exists to efficiently manage the mobility of an MS in a wireless communication system.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for efficiently managing the mobility of a Mobile Station (MS) in a wireless communication system.

Another aspect of the present disclosure is to provide an apparatus and a method for managing a control signaling function and a data flow management function independently in a wireless communication system.

Another aspect of the present disclosure is to provide an apparatus and a method for changing a Base Station (BS) having a control signaling function independently from a BS performing a data flow management function in a wireless communication system.

The above aspects are achieved by providing an apparatus and a method for managing mobility in a wireless communication system.

In accordance with an aspect of the present disclosure, a wireless communication system is provided. The wireless communication system includes a plurality of BSs directly connected to the Internet without an upper node, and configured to provide wireless access to at least one MS. The plurality of BSs construct a BS set for providing service to the at least one MS, and a first BS of the plurality of BSs functions as a control master and is configured to perform control signaling with the at least one MS, and a second BS of the plurality of BSs functions as a data master and is configured to perform scheduling for service provision through the BS set and to operate as an Internet Protocol (IP) endpoint of the at least one MS.

In accordance with another aspect of the present disclosure, a method for operating a BS in a wireless communication system is provided. The method includes performing a control master function of performing control signaling with an MS and a data master function of performing scheduling for service provision through a BS set and operating as an IP endpoint of the MS, within the BS set for providing service to the MS, determining a transfer of the control master function according to a satisfaction or a non-satisfaction of a first condition, and sending a message for transferring the control master function to another BS, while maintaining the data master function.

In accordance with another aspect of the present disclosure, a method for operating a BS in a wireless communication system is provided. The method includes performing a control master function of performing control signaling with an MS, within a BS set for providing service to the MS, determining a transfer of a data master function of performing scheduling for service provision through the BS set according to a satisfaction or a non-satisfaction of a second condition, and sending a message for receiving the transfer of the data master function from a BS performing the data master function.

In accordance with another aspect of the present disclosure, a BS apparatus in a wireless communication system is provided. The apparatus includes a control unit and a communication unit. The control unit is configured to perform a control master function of performing control signaling with an MS and a data master function of performing scheduling for service provision through a BS set and operating as an IP endpoint of the MS, within the BS set for providing service to the MS, and to determine a transfer of the control master function according to a satisfaction or a non-satisfaction of a first condition. The communication unit is configured to send a message for transferring the control master function to another BS, while maintaining the data master function.

In accordance with another aspect of the present disclosure, a BS apparatus in a wireless communication system is provided. The apparatus includes a control unit and a communication unit. The control unit is configured to perform a control master function of performing control signaling with an MS, within a BS set for providing service to the MS, and to determine a transfer of a data master function of performing scheduling for service provision through the BS set according to a satisfaction or a non-satisfaction of a second condition. The communication unit is configured to send a message for receiving the transfer of the data master function from a BS performing the data master function.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

Figure 1B:
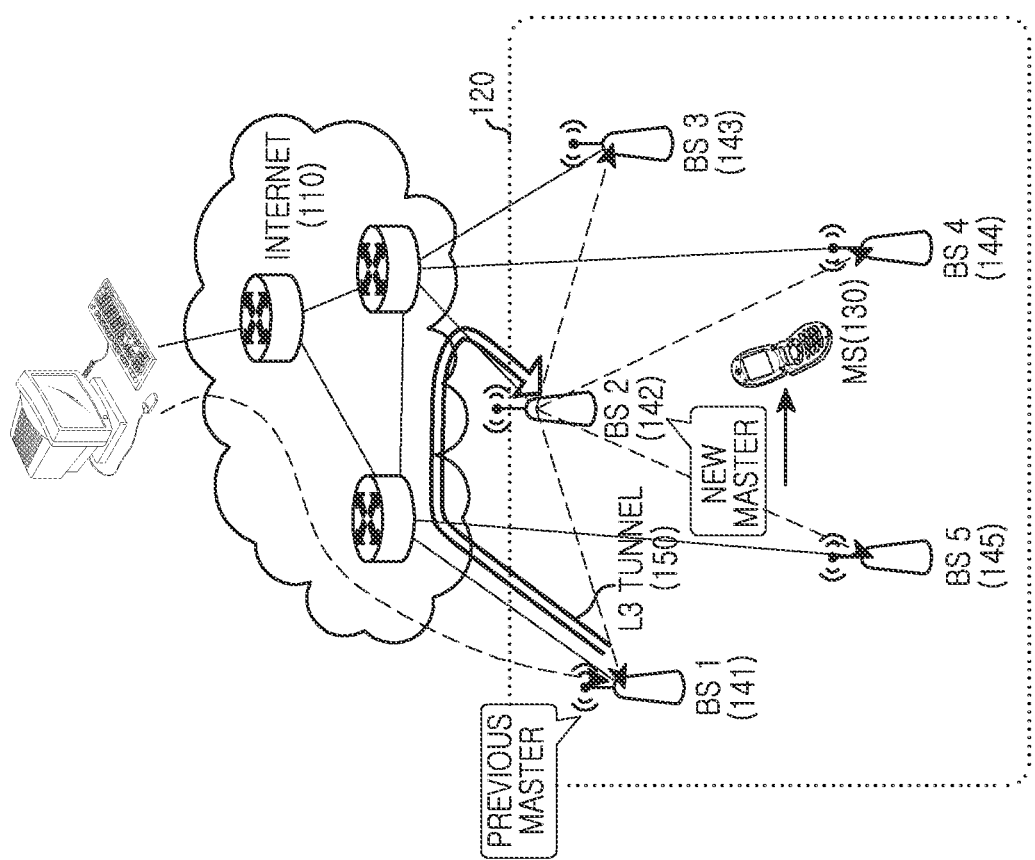
FIGS. 1A and 1B illustrate a flat network structure according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Embodiments of the present disclosure describe a technology for more efficiently managing the mobility of a Mobile Station (MS) in a wireless communication system.

In the following description, terms for identifying Base Stations (BSs) having specific functions and terms for identifying respective objects are merely for convenience. Accordingly, the present disclosure is not limited to the terms described herein, and other terms that refer to objects having equivalent technological meaning may be used.

A wireless communication system according to an embodiment of the present disclosure has a flat network structure. The flat network has a structure in which BSs providing wireless access are directly connected to the Internet without an upper node, such as a gateway. This leads to a phenomenon in which traffic loads from a plurality of BSs are concentrated on an intermediate node, so the flat network can provide a gain in managing a small cell network.

Further, to provide a high transfer rate in a cell boundary as well as a cell center, the wireless communication system employs a scheme in which a plurality of BSs provide a service to one MS. In other words, in the wireless communication system, the plurality of BSs can construct a BS set, and the BSs belonging to the BS set can organize transmission to one MS. The BS set can be referred to as a 'virtual cell' or a 'cloud cell'. A combination of the BSs constructing the BS set can be changed according to the movement of the MS.

The BS set is user-centered, and is constructed to provide a service to one MS and provide a boundless experience to a user. One of the BSs within the BS set has a need to adjust the transmission from the plurality of BSs to the MS. In the present disclosure, a BS performing a function of adjusting the BSs within the BS set is referred to as a 'master BS'.

Figure 1A:
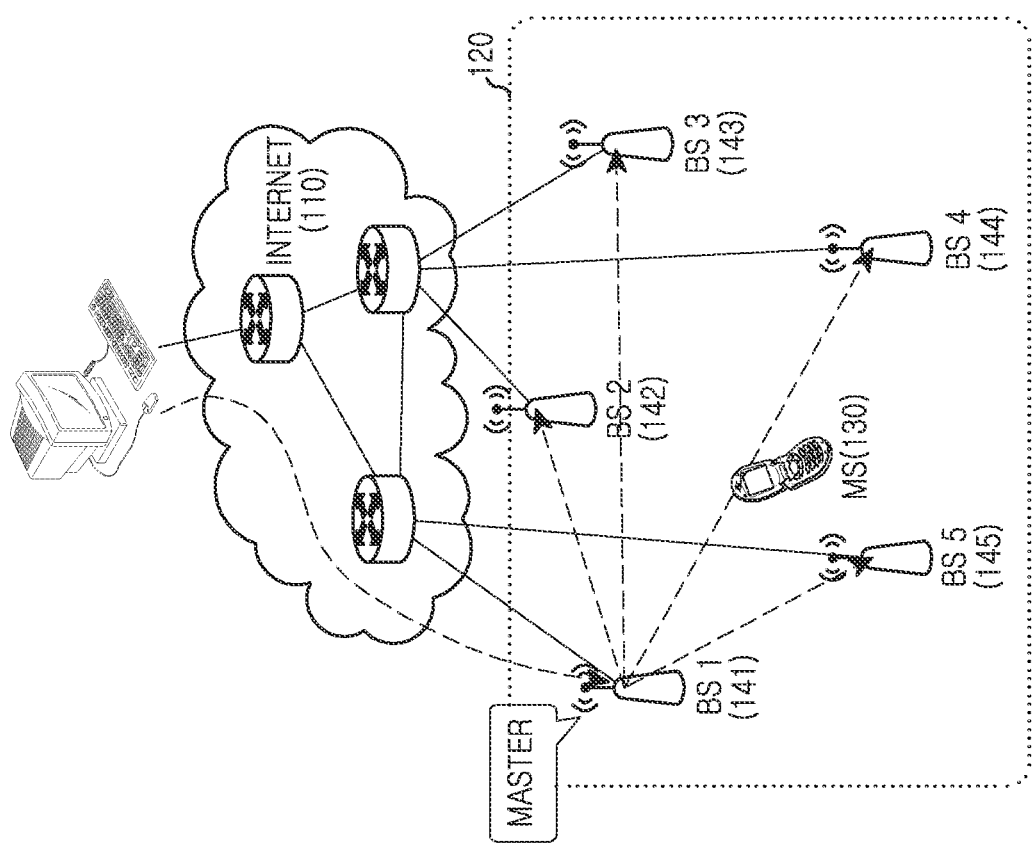

FIGS. 1A and 1B illustrate a flat network structure according to an embodiment of the present disclosure.

Referring to FIGS. 1A and 1B, BSs 141, 142, 143, 144, and 145 can be directly connected to the Internet 110, and the BSs 141 to 145 construct a BS set 120 for an MS 130. Though not illustrated in FIGS. 1A and 1B, each of the BSs 141 to 145 can perform a Home Agent (HA) function and a Foreign Agent (FA) function. Accordingly, the MS 130 can receive a boundless service within the BS set 120 by receiving a service from the BSs 141 to 145. In the embodiment of FIGS. 1A and 1B, the first BS 141 among the BSs 141 to 145 functions as a master. For convenience of description, a 'BS functioning as a master' is referred to as a 'master BS'. Accordingly, the first BS 141 controls the construction and management of the BS set 120, transmission scheduling (e.g., resource allocation) for the MS 130, a function of distributing scheduled packets to the member BSs 142 to 145, and the like. At this time, the adjustment of transmission between the BSs 141 to 145 is carried out through a fronthaul link. The fronthaul link represents a direct link between the BSs 141 to 145, and can be based on a wireless or a wired connection.

Through the BS set 120, a transfer rate at a cell boundary can be improved, and seamless handover can be provided. Because it is desirable that the master BS has an excellent link quality with the MS 130, the master BS can be changed according to the movement of the MS 130. Alternatively, the master BS can be changed according to a load state of the first BS 141 performing the master function. For example, as in FIG. 1B, if the MS 130 gets closer to the second BS 142 than the first BS 141, the master function is moved to the second BS 142. At this time, owing to the flat network structure, the change of the master BS to the second BS 142 results in the change of an Internet Protocol (IP) endpoint.

If the change of the IP endpoint brings about the change of an IP address, a continuity of service is not provided. Accordingly, there can be a demand for an IP mobility event for maintaining a session through an IP address that is being used. In other words, in a case of the flat network, because the BSs are directly connected to the Internet, the continuity of service can be provided by an IP mobility technology, such as a Mobile IP (MIP) and a Proxy Mobile IP (PMIP). As a result, as in FIG. 1B, the first BS 141 being a previous master can function as an HA, and the second BS 142 being a new master can function as an FA. Accordingly, a Layer 3 (L3) tunnel 150 is created between the first BS 141 and the second BS 142, and data toward the MS 130 is forwarded to the second BS 142 through the L3 tunnel 150.

However, the IP mobility event may have a negative influence on a seamless service. Therefore, the wireless communication system according to an embodiment of the present disclosure proposes a method of, in supporting the BS set in the flat network structure, minimizing the occurrence of the IP mobility event.

The present disclosure proposes a network structure in which master BSs are referred to as a 'data master' and a 'control master' in a system in which a plurality of BSs cooperatively provide a service. In addition, the present disclosure proposes an operation of managing mobility through data master and control master change procedures. The network structure according to an embodiment of the present disclosure is given below.

The present disclosure defines two functional objects referred to as a control master and a data master within a BS set. The control master and the data master can belong to one BS or a plurality of BSs. The control master within the BS set takes charge of a BS set management function of adding or removing a member BS to or from the BS set based on a Channel Quality Indicator (CQI) report from an MS. For example, the control master takes charge of control signaling with the MS and also takes charge of BS set construction. The data master within the BS set takes charge of data distribution within the BS set including data scheduling for providing a service to the MS. In addition, the data master is operated as an IP endpoint of the MS. The requirements for the two functional elements can vary according to a concrete BS set.

The BS functioning as the control master within the BS set has to have a stable link with the MS so as to effectively manage the BS set. For convenience of description, in the present disclosure, the 'BS functioning as the control master' is referred to as the 'control master BS'. Accordingly, if a link between the control master BS and the MS deteriorates, the control master has to be moved to another BS within the BS set. In addition, the BS functioning as the data master has to be able to receive information from the control master BS and, for the sake of service to the MS, should be able to perform communication with member BSs of a suitable number within the BS set. For convenience of description, in the present disclosure, the 'BS functioning as the data master' is referred to as the 'data master BS'. Accordingly, even if a link between the data master BS and the MS deteriorates, there is no need to change the data master. Therefore, if the movement of the MS leads to the deterioration of the link between the control master BS and the MS, only the control master needs to be moved to another BS. Although the data master BS fails to have a direct link with the MS, the data master does not need to be moved.

The aforementioned scheme is for avoiding an unnecessary start of IP mobility having a negative influence on Qualities of Service (QoS) of active flows. In a case where a mobile user moves around a specific area and traffic is sensitive to a delay, the aforementioned mechanism is useful in a case of small mobility.

Figure 2:
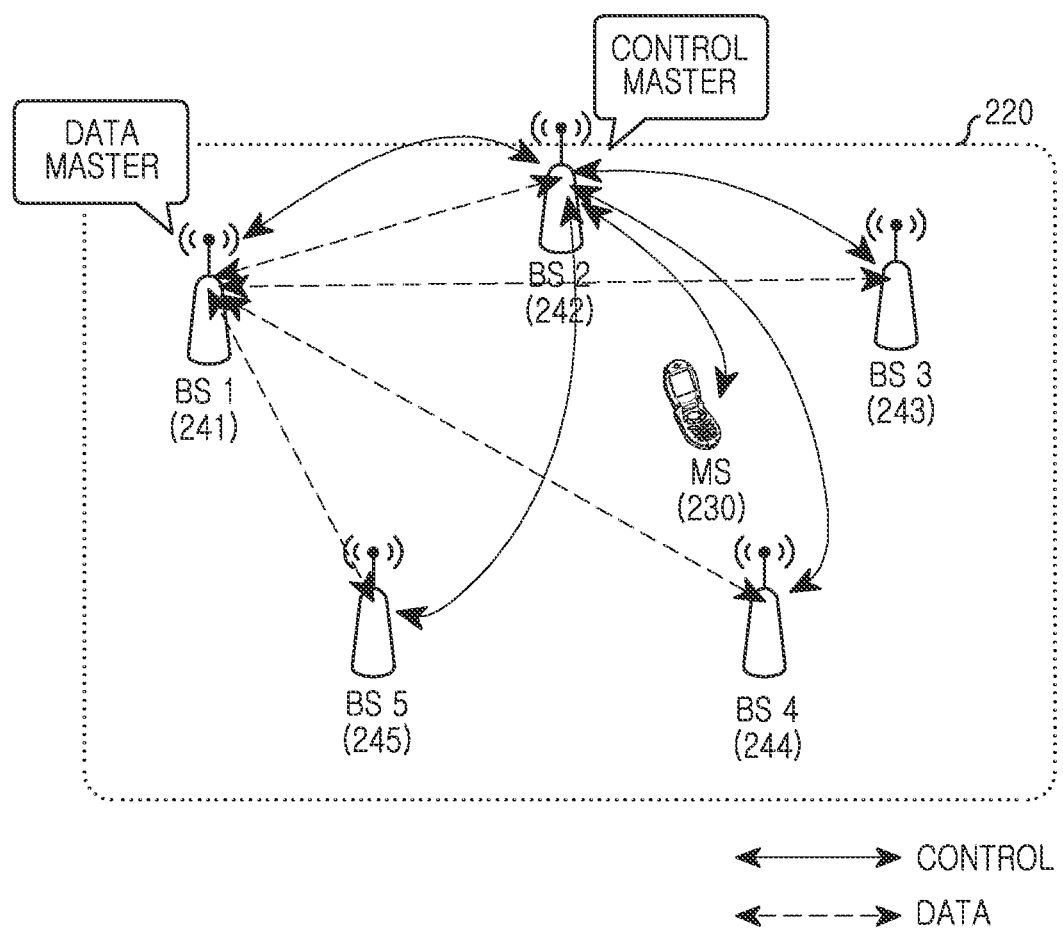
FIG. 2 illustrates a network structure of a wireless communication system according to an embodiment of the present disclosure.

FIG. 2 illustrates a network structure of a wireless communication system according to an embodiment of the present disclosure.

Referring to FIG. 2, BSs 241, 242, 243, 244, and 245 construct a BS set 220 for an MS 230. At this time, the first BS 241 functions as a data master, and the second BS 242 functions as a control master. The control master is a functional object within the BS set 220. The control master BS 242 receives CQI reports from the MS 230, and updates the BS set 220. If a link between the control master BS 242 and the MS 230 deteriorates, to effectively perform a control master function, the control master BS 242 can move the control master function to one of the other BSs 241, 243, 244, and 245 within the BS set 220. The data master function belongs to a BS in which the MS 230 has started a session. In addition, the data master BS 241 uses a fronthaul to perform communication with the other member BSs 242, 243, 244, and 245 for data parsing in the BS set 220. The adjustment between the control master BS 242 and the data master BS 241 can be carried out through inter-BS message exchange. The adjustment includes the following information:

a) Provision of a CQI report from the control master to the data master;

b) Provision of scheduling information from the data master to the control master; and c) Status report of the data master to the control master for data master change determination in the control master.

In an embodiment, most users gain access to a network around a small geographical area, such as an office, a campus, and a residential area, and the like, covered by a small number of BSs. In the present disclosure, the aforementioned mechanism noticeably reduces the number of IP mobility events, such as an MIP and a PMIP, and improves the quality of a user's experience.

In the network structure of FIG. 2, uplink and downlink data transmission mechanisms need adjustment between both the control master and the data master that belong to an intra-network. According to the movement of an MS, the control master and the data master can belong to the same BS or different BSs. Accordingly, if two objects belong to different BSs and the data master does not have a link with the MS, the uplink and downlink data transmission mechanisms for the BS set according to an embodiment of the present disclosure are described below.

If a BS set is constructed, downlink transmission to an MS is processed by a plurality of BSs within the BS set. If a BS set is constructed, downlink transmission to the MS is processed by a plurality of BSs within the BS set. A selection of member BSs for current transmission is based on CQIs between the MS and the member BSs within the BS set. Once data transmitted to the MS exists, downlink synchronization between the member BSs has been achieved, and CQI measurement in the MS can be achieved through transmission of downlink reference signals from the member BSs. Under the premise that the data master does not have a direct communication link with the MS, a CQI measured in the MS is forwarded to the data master through the control master. Based on the reports, the data master performs resource allocation and addresses collisions between different member BSs, and creates scheduling information for transmission. The created scheduling information is transmitted to all of the member BSs including the MS through the control master. If the scheduling information is transmitted, actual data is transmitted to the MS according to the scheduling. Below, an embodiment of the present disclosure describes downlink transmission with reference to the drawings.

Figure 3:
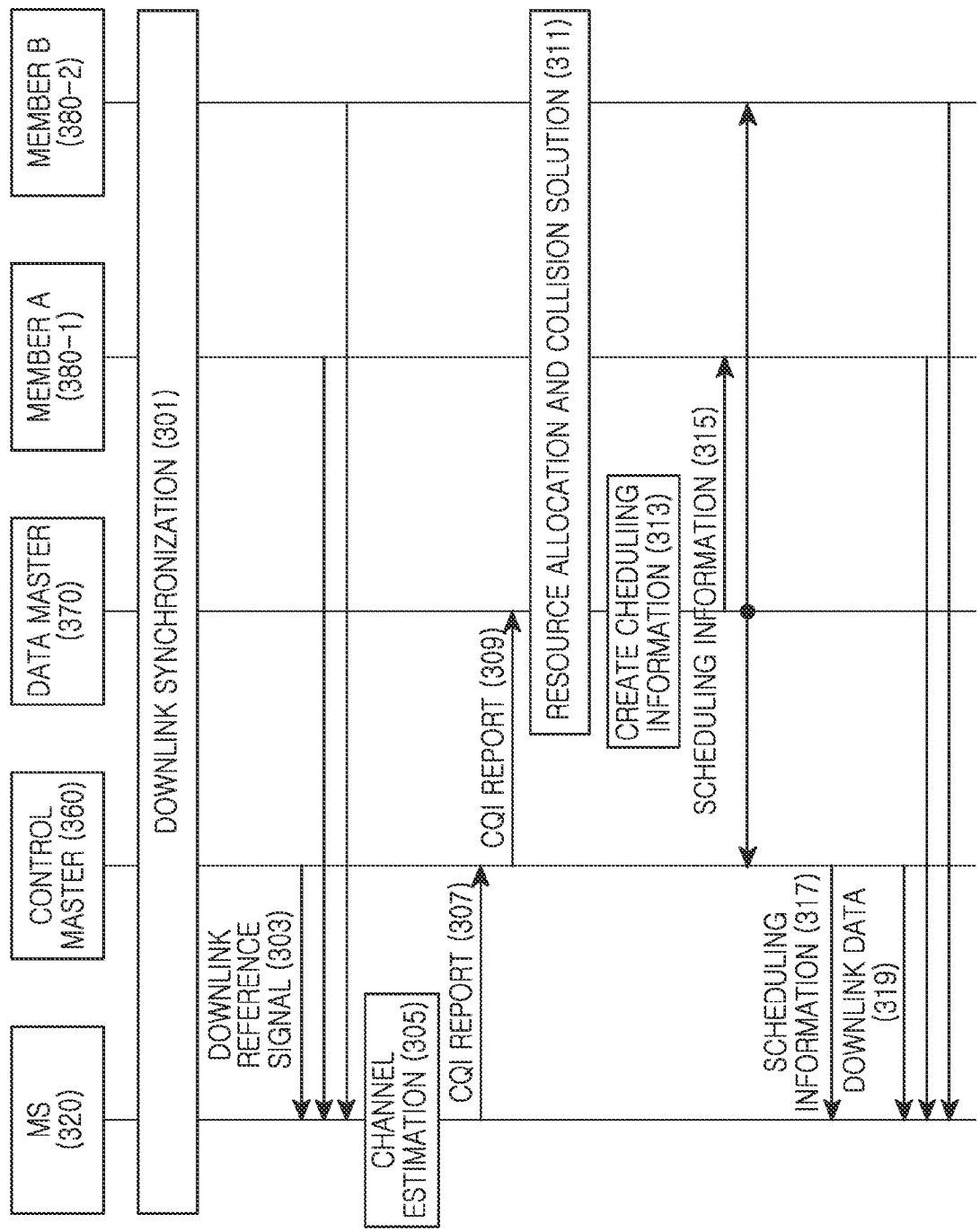
FIG. 3 is a flow diagram illustrating a downlink data transmission process in a wireless communication system according to an embodiment of the present disclosure.

FIG. 3 is a flow diagram illustrating a downlink data transmission process in a wireless communication system according to an embodiment of the present disclosure.

Referring to FIG. 3, in operation 301, downlink synchronization between an MS 320 and BSs 360, 370, 380-1, and 380-2 belonging to a BS set is performed. The downlink synchronization represents a process of synchronizing signal transmission timing in order for a plurality of transmitting ends to transmit signals to one receiving end.

In operation 303, the BSs 360, 380-1, and 380-2 that will perform downlink transmission each transmit downlink reference signals to the MS 320. In the embodiment of FIG. 3, because only the control master BS 360, the member BS A 380-1, and the member BS B 380-2 perform downlink transmission to the MS 320, the data master BS 370 transmits no downlink reference signal to the MS 320. However, according to another embodiment of the present disclosure, even the data master BS 370 can participate in the downlink transmission. In this case, even the data master BS 370 transmits a downlink reference signal to the MS 320.

In operation 305, the MS 320 receives the downlink reference signals transmitted from the respective BSs, and estimates a channel quality per BS using the received downlink reference signals. The MS 320 creates a CQI report including channel quality information per BS and, in operation 307, transmits the created CQI report to the control master BS 360. In operation 309, the control master BS 360 provides the CQI report received from the MS 320, to the data master BS 370. The CQI report includes values indicating the channel quality per BS. For example, the CQI report can include at least one of a Signal to Noise Ratio (SNR) per BS, a Signal to Interference plus Noise Ratio (SINR), a Carrier to Noise Ratio (CNR), a Carrier to Interference plus Noise Ratio (CINR), and a Received Signal Strength Indication (RSSI).

Thereafter, in operation 311, the data master BS 370 performs scheduling for downlink transmission, and addresses collisions. The scheduling includes allocating resources for transmitting a downlink signal to the MS 320, determining a signal transmission scheme, and the like. Addressing collisions includes determining if resources are redundantly allocated to the member BSs 380-1 and 380-2 and preventing redundant allocation. Each BS can simultaneously belong to a plurality of BS sets. In this case, because different data master BSs each perform scheduling, the BS simultaneously belonging to the plurality of BS sets can be allocated the same resource from each BS set. In this case, if hardware resources (i.e., Radio Frequency (RF) chains) are insufficient, the BS simultaneously belonging to the BS sets cannot simultaneously transmit a signal for the sake of the different BS sets. Accordingly, the data master BS 370 addresses the collision. To address the collision, the data master BS 370 can exchange scheduling-related information with at least one other BS.

Thereafter, in operation 313, the data master BS 370 creates scheduling information. For example, the scheduling information includes at least one of a position of an allocated resource, a resource quantity, a Multiple Input Multiple Output (MIMO) scheme, and a Modulation and Coding Scheme (MCS). In operation 315, the data master BS 370 transmits the scheduling information to the control master BS 360, the member BS A 380-1, and the member BS B 380-2. Accordingly, in operation 317, the control master BS 360 transmits the scheduling information to the MS 320. Therefore, the respective nodes within the BS set share the same scheduling information.

Thereafter, in operation 319, the control master BS 360, the member BS A 380-1, and the member BS B 380-2 transmit downlink data to the MS 320 according to the scheduling information. In addition, the MS 320 receives the downlink data according to the scheduling information. At this time, the control master BS 360, the member BS A 380-1, and the member BS B 380-2 may perform beamforming.

In a case of uplink transmission, after initial synchronization, uplink reference signals are transmitted from the MS to member BSs. As the member BSs receive the uplink reference signals, each of the member BSs measures a CQI, and reports the CQI to a data master. As the data master receives the CQI report, the data master performs resource allocation and addresses collisions, and creates scheduling information for uplink transmission. Thereafter, the scheduling information is transmitted to the member BSs, and is forwarded to the MS through the control master. If the scheduling information is received, actual data is transmitted according to the scheduling information.

Figure 4:
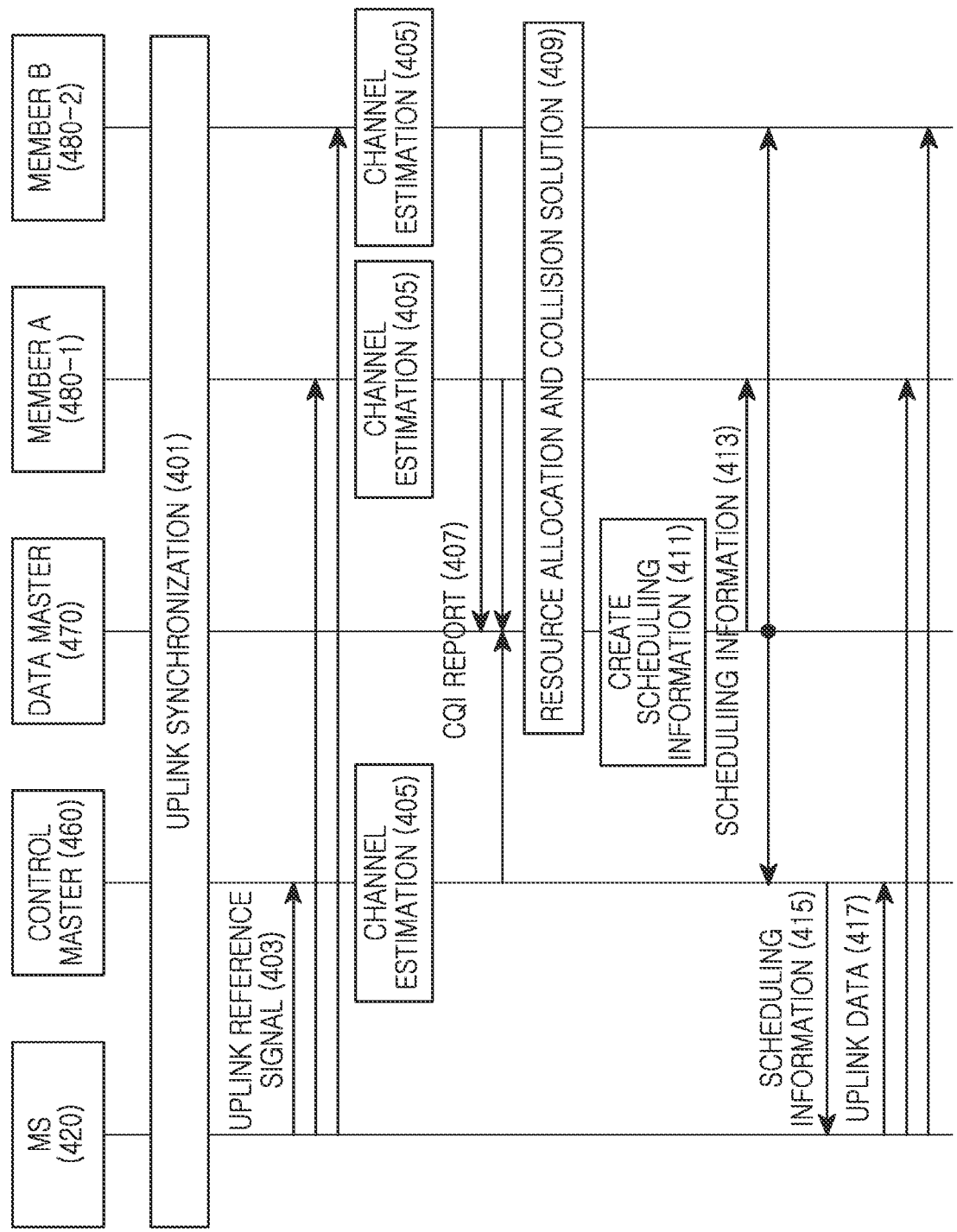
FIG. 4 is a flow diagram illustrating an uplink data transmission process in a wireless communication system according to an embodiment of the present disclosure.

FIG. 4 is a flow diagram illustrating an uplink data transmission process in a wireless communication system according to an embodiment of the present disclosure.

Referring to FIG. 4, in operation 401, uplink synchronization between an MS 420 and BSs 460, 470, 480-1, and 480-2 belonging to a BS set is performed. The uplink synchronization represents a process of synchronizing signal reception timing in order for a plurality of receiving ends to receive a signal from one transmitting end.

In operation 403, the MS 420 transmits an uplink reference signal to the BSs 460, 480-1, and 480-2. In the embodiment of FIG. 4, because only the control master BS 460, the member BS A 480-1, and the member BS B 480-2 perform uplink communication, the data master BS 470 receives no uplink reference signal from the MS 420. However, according to another embodiment of the present disclosure, even the data master BS 470 can participate in the uplink communication. In this case, even the data master BS 470 receives an uplink reference signal from the MS 420.

In operation 405, the BSs 460, 480-1, and 480-2 that will perform uplink transmission each receive the uplink reference signals transmitted from the MS 420, and estimate a channel quality using the received uplink reference signals. The BSs 460, 480-1, and 480-2 each create a CQI report including measured channel quality information and, in operation 407, provide the created CQI reports to the data master BS 470. The CQI report includes values indicating the uplink channel quality for the MS 420. For example, the CQI report can include at least one of an SNR, an SINR, a CNR, a CINR, and an RS SI.

Thereafter, in operation 409, the data master BS 470 performs scheduling for uplink transmission, and addresses collisions. The scheduling includes allocating resources in order for the MS 420 to transmit an uplink signal, determining a signal transmission scheme, and the like. Addressing collisions includes determining if resources are redundantly allocated to the member BSs 480-1 and 480-2 and preventing redundant allocation. Each BS can simultaneously belong to a plurality of BS sets. In this case, because different data master BSs each perform scheduling, the BS simultaneously belonging to the plurality of BS sets can be allocated the same resource from each BS set. In this case, if hardware resources are insufficient, the BS simultaneously belonging to the BS sets cannot transmit a signal simultaneously for the different BS sets. Accordingly, the data master BS 470 addresses the collision. To address the collision, the data master BS 470 can exchange scheduling-related information with at least one other BS.

Thereafter, in operation 411, the data master BS 470 creates scheduling information. For example, the scheduling information includes at least one of a position of an allocated resource, a resource quantity, a MIMO scheme, and an MCS. In operation 413, the data master BS 470 transmits the scheduling information to the control master BS 460, the member BS A 480-1, and the member BS B 480-2. Accordingly, in operation 415, the control master BS 460 transmits the scheduling information to the MS 420. Therefore, the respective nodes within the BS set share the same scheduling information.

Thereafter, in operation 417, the MS 420 transmits uplink data to the control master BS 460, the member BS A 480-1, and the member BS B 480-2 according to the scheduling information. In addition, the control master BS 460, the member BS A 480-1, and the member BS B 480-2 receives the uplink data according to the scheduling information. At this time, the MS 420 may perform beamforming.

In the wireless communication system described above, mobility management is largely divided into small mobility management and large mobility management. The small mobility management occurs when an MS is moved enough not to need a data master change, and the large mobility management occurs when the MS is moved enough to need the data master change. The small mobility management is described below.

If a BS set is constructed initially, both the control master and the data master belong to a single BS. If a communication link between the BS and an MS deteriorates and the MS has active sessions, the control master is moved to another BS within the BS set. In addition, the data master BS is not removed from the BS set. However, if a communication link between the data master BS and a specific member BS deteriorates, the data master BS can be removed from the BS set. The change of the control master does not initiate IP mobility in a network. A unique change on network operation is that adjustment between the control master and the data master is carried out through a fronthaul link, because the control master and the data master are carried out by different BSs.

Figure 5B:
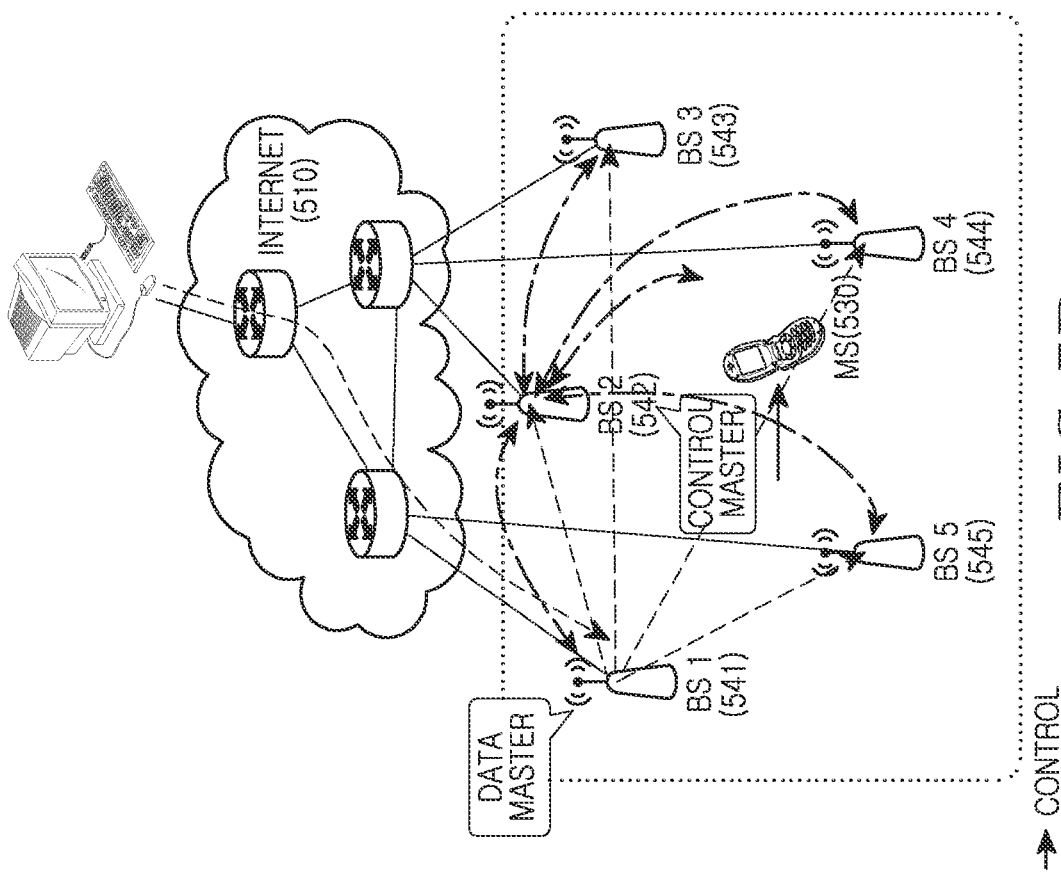
FIGS. 5A and 5B illustrate a control master change in a wireless communication system according to an embodiment of the present disclosure.
Figure 5A:
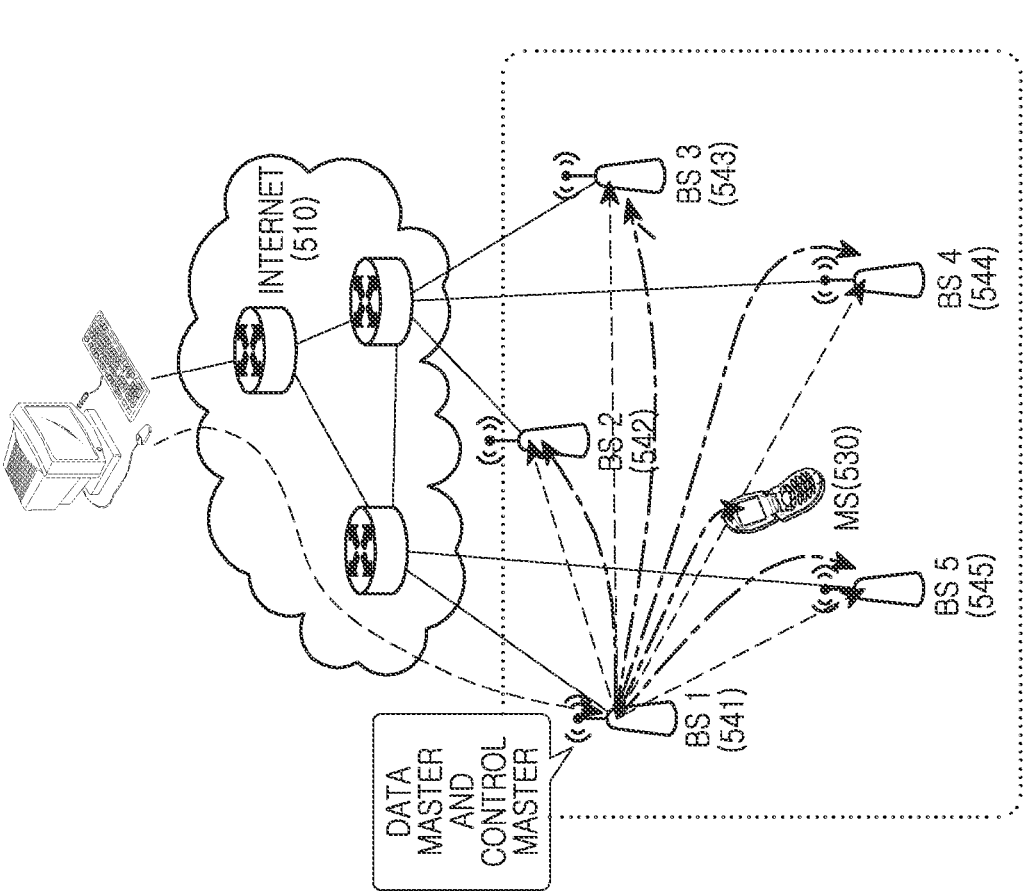

FIGS. 5A and 5B illustrate a control master change in a wireless communication system according to an embodiment of the present disclosure.

Referring to FIGS. 5A and 5B, a first BS 541 functions as a data master and control master. The first BS 541 can perform communication with other member BSs 542, 543, 544, and 545, which can be directly connected to the Internet 510, and takes charge of scheduling for communication with an MS 530 and data distribution. At this time, as the MS 530 moves, the control master is moved to the second BS 542. While the data master still belongs to the first BS 541. Accordingly, IP mobility is not initiated despite the movement of the control master. The large mobility management is described below.

If an MS is moving around a small geographical area in a network, the small mobility management is used, and IP mobility in the network is not needed. However, if the MS moves distant from a BS in which a flow for the MS has been created, the IP mobility is initiated by the large mobility management. The large mobility management is processed by moving a data master function to a current control master BS and performing IP mobility between a previous data master BS and a new data master BS.

Figures 6A, 6B:
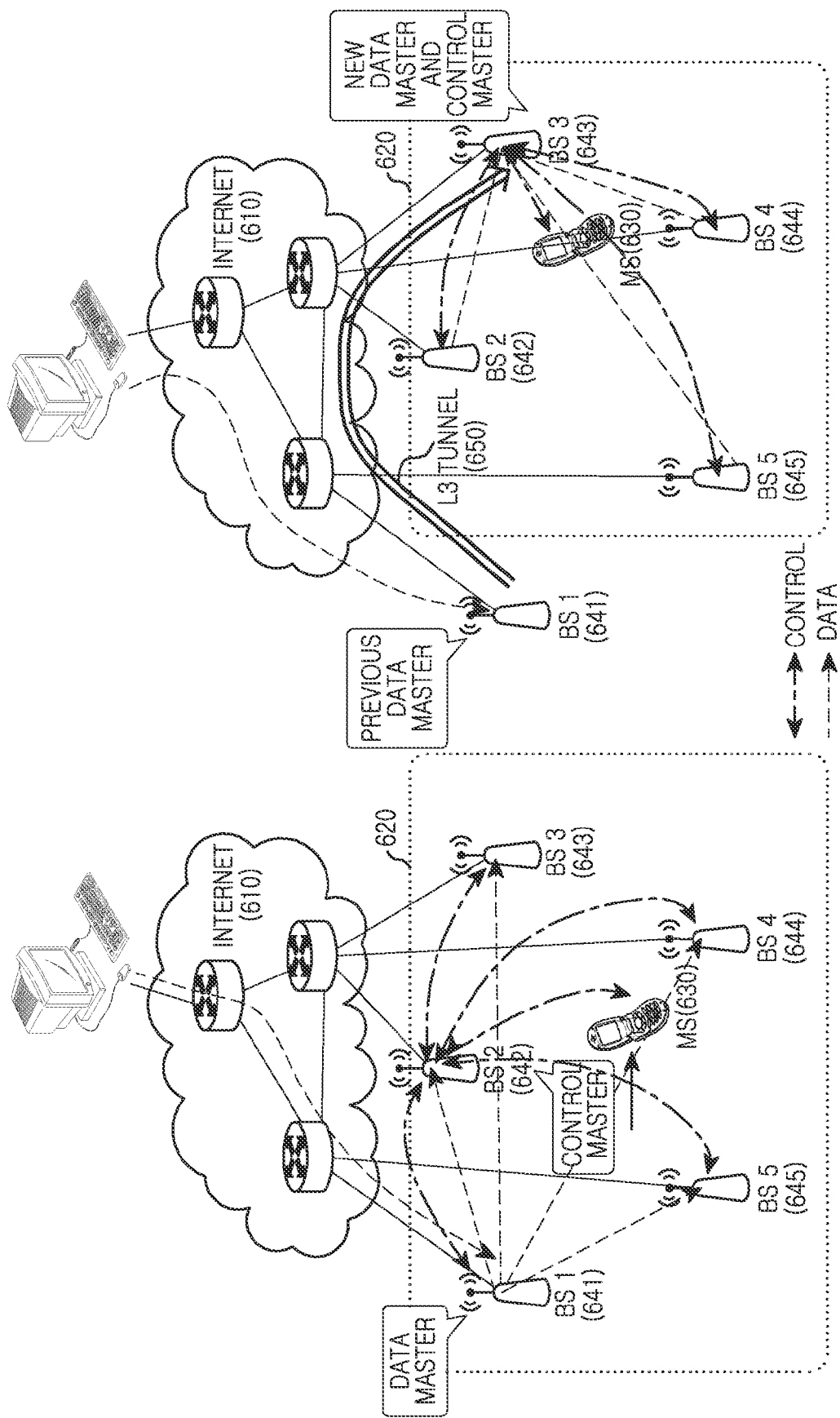
FIGS. 6A and 6B illustrate a data master change in a wireless communication system according to an embodiment of the present disclosure.

FIGS. 6A and 6B illustrate a data master change in a wireless communication system according to an embodiment of the present disclosure.

Referring to FIGS. 6A and 6B, a first BS 641 functions as a data master, and a second BS 642 functions as a control master. The first BS 641 can perform communication with the other member BSs 642, 643, 644, and 645 including the second BS 642, which can be directly connected to the Internet 610, and takes charge of scheduling for communication with an MS 630 and data distribution. At this time, as the MS 630 moves closer to the third BS 643, the control master moves from the second BS 642 to the third BS 643. In addition, the first BS 641 is excluded from a BS set 620. Thereafter, the third BS 643 functioning as a new control master determines whether the change of the data master is needed. Whether the change of the data master is needed can be determined by indexes. In the embodiment of FIGS. 6A and 6B, it is determined that the change of the data master is needed, and the data master is moved to the third BS 643 functioning as the current control master. Accordingly, if the MS 630 has an active session, IP mobility is performed. The IP mobility is for providing a continuity of service by maintaining the session despite the change of an IP endpoint. More specifically, as the IP mobility, an MIP technique, a PMIP technique, and the like, can be applied. Through this, an L3 tunnel 650 between the first BS 641 being the previous data master and the third BS 643 being the current data master is created and, through the L3 tunnel 650, downlink data of the MS 630 is received through the first BS 641 and the third BS 643, and uplink data of the MS 630 is transmitted through the third BS 643 and the first BS 641. However, if the MS 630 does not have the active session, the IP mobility may not be performed.

As described above referring to FIGS. 5A, 5B, 6A, and 6B, the small mobility management is achieved through the change of only the control master, and the large mobility management is achieved through the change of the data master or the change of both the control master and the data master. In other words, processing small mobility and large mobility is achieved through the change of the control master and the data master within the BS set. For example, the mobility can be indirectly processed using BS set update in the BS set. The network monitors the BS set as to whether there is a need to change the control master and the data master. After an initial network entry procedure, the BS set is constructed for the MS, and the control master and the data master belong to a single BS. The MS can initiate the session through the BS functioning as both the control master and the data master. If the MS moves during the active session, it is continuously monitored whether the change of the control master and the data master is needed. Determining the change of the control master and the data master is based on different indexes. The indexes described below are not exclusive, so some indexes can be excluded or other indexes can be considered in more detail. Examples of indexes for control master change are given below.

The indexes for the control master change can include at least one of whether a link quality between a control master and an MS is less than a threshold value and whether the control master is overloaded. The overload represents a situation in which the number of MSs having one BS as the control master exceeds a threshold value. For example, at least one of the listed indexes can be included in a condition set for the control master change. Examples of indexes for data master change are given below.

The indexes for the data master change can include at least one of whether a control master and a data master belong to different BSs, and all active sessions have ended, whether the data master and the control master are a greater distance than N-hop due to the change of the control master, and whether the number of member BSs reachable by N-hop is less than 'M'. The variable 'N' and the variable 'M' denote threshold values. The variable 'N' can be defined as an integer of '1' or more, and the variable 'M' can be defined as the number of member BSs used for cooperative communication, i.e., constructing the BS set. For example, at least one of the listed indexes can be included in a condition set for the data master change.

If the control master change is determined, one of the member BSs is selected as a new control master BS by means of a selection reference, such as a link quality with an MS, and the like. Besides the link quality, the number of hops with a data master BS can be more considered. The selection of a member BS closer to the data master is for avoiding the change of the data master after the control master change. In other words, the new control master BS can be selected based on at least one of the link quality with the MS and the number of hops with the data master. Therefore, if the control master and the data master belong to the same BS, the change of the data master is not needed.

On the other hand, if the data master change is determined, there is no need to select a member BS for the data master. This is because a current control master is the best selection for the data master, so wireless adjustment between the control master and the data master is made unnecessary. Accordingly, at data master change, a current control master BS is selected as a new data master BS. The control master change procedure is given below.

There are two cases concerning the control master change procedure. The first case is a case that the control master and the data master belong to the same BS, and the second case is a case that the control master and the data master belong to different BSs. In both the first case and the second case, the control master determines whether the control master should be changed based on the aforementioned indexes for the control master change. In addition, the current control master selects a member BS as a new control master. Thereafter, the current control master sends a control master change request to the member BS selected as the new control master. If the member BS accepts the control master change request, the current control master is changed into the member BS that is the new control master, and the control master change is notified to all BSs within the BS set and the MS. In the first case, after the control master is moved to another BS, the data master still belongs to the same BS that is a part of the BS set. In contrast, in the second case, after the control master is moved to another BS, if a previous control master BS is still qualified to be a member BS, the previous control master BS can be a part of the BS set. Otherwise, the previous control master BS is removed from the BS set. A control master change procedure for each case is described below with reference to the drawings.

Figure 7:
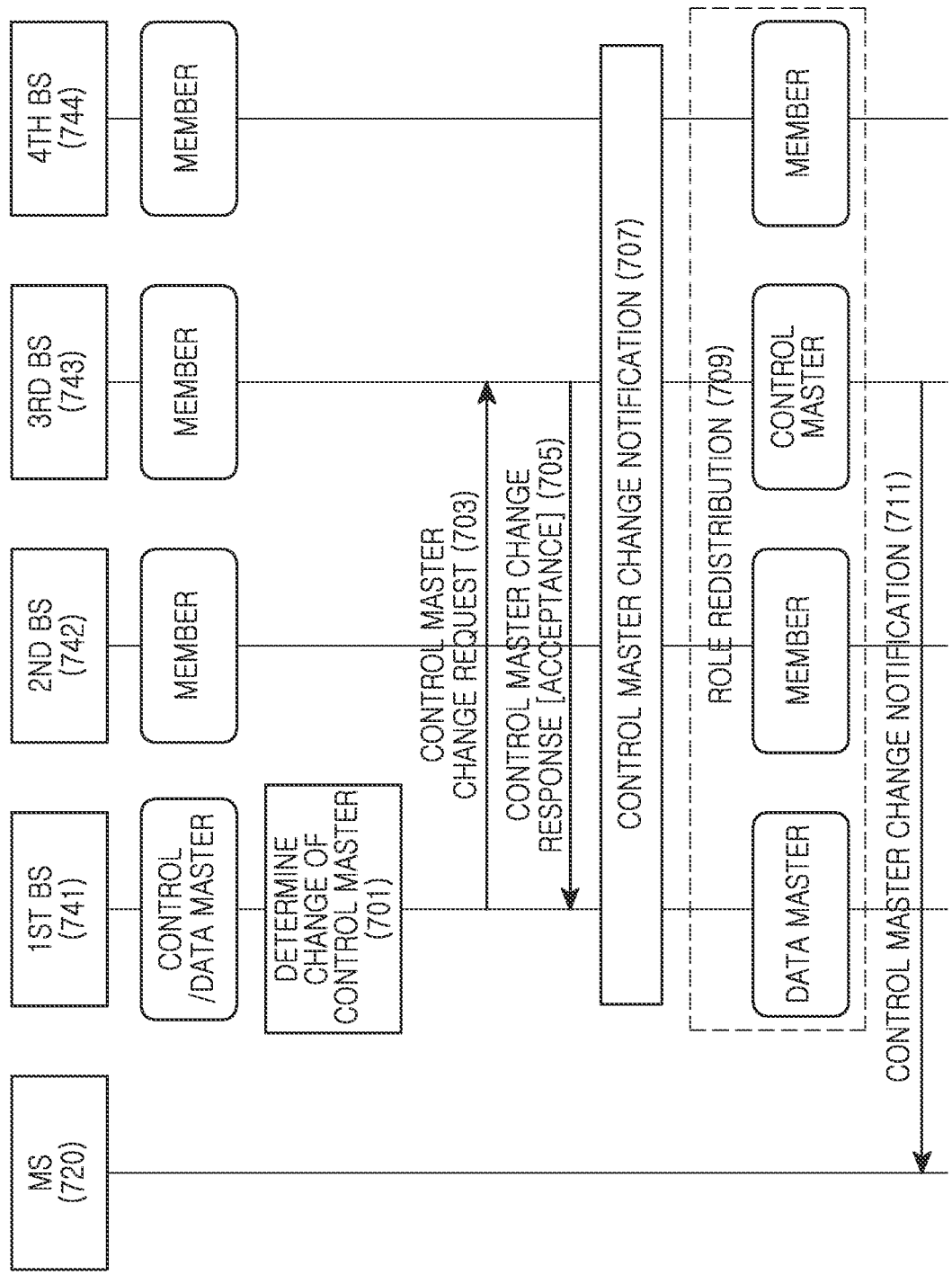
FIG. 7 is a flow diagram illustrating a signal exchange for a control master change in a wireless communication system according to an embodiment of the present disclosure.

FIG. 7 is a flow diagram illustrating a signal exchange for control master change in a wireless communication system according to an embodiment of the present disclosure. FIG. 7 illustrates an embodiment of a case where a control master and a data master belong to the same BS.

Referring to FIG. 7, a first BS 741, a second BS 742, a third BS 743, and a fourth BS 744 construct a BS set. At this time, the first BS 741 functions as the control master and data master, and the second BS 742, the third BS 743, and the fourth BS 744 function as members.

In operation 701, the first BS 741 determines the change of the control master. As described above, the first BS 741 can determine the change of the control master based on at least one of whether a link quality between the first BS 741 and an MS 720 is less than a threshold value, and the overload or non-overload of the first BS 741 as the control master. In addition, the first BS 741 selects one of the member BSs as a new control master BS. At this time, the present disclosure assumes that the third BS 743 is selected as the new control master BS.

In operation 703, the first BS 741 sends a control master change request message to the third BS 743. In operation 705, the third BS 743 sends the first BS 741 a control master change response message accepting a control master change request. However, according to another embodiment of the present disclosure, the third BS 743 can send the first BS 741 a control master change response message refusing the control master change request. For example, the third BS 743 can determine if the third BS 743 itself is suitable as the control master according to a reference for control master selection and, when it is determined that the third BS 743 itself is not suitable as the control master, the third BS 743 can send the first BS 741 the control master change response message refusing the control master change request. For example, the reference for the control master selection can include at least one of a link quality between the third BS 743 and the MS 720, and the overload or non-overload of the third BS 743 as the control master.

In operation 707, the first BS 741 sends a control master change notification to all the other BSs 742 to 744 within the BS set. Accordingly, in operation 709, all the BSs 741, 742, 743, and 744 within the BS set recognize that a role of each BS is redistributed. As a result, the first BS 741 functions as the data master, and the third BS 743 functions as the control master, and the second BS 742 and the fourth BS 744 function as the members. Thereafter, in operation 711, the third BS 743 having become the new control master sends the control master change notification to the MS 720.

Figure 8:
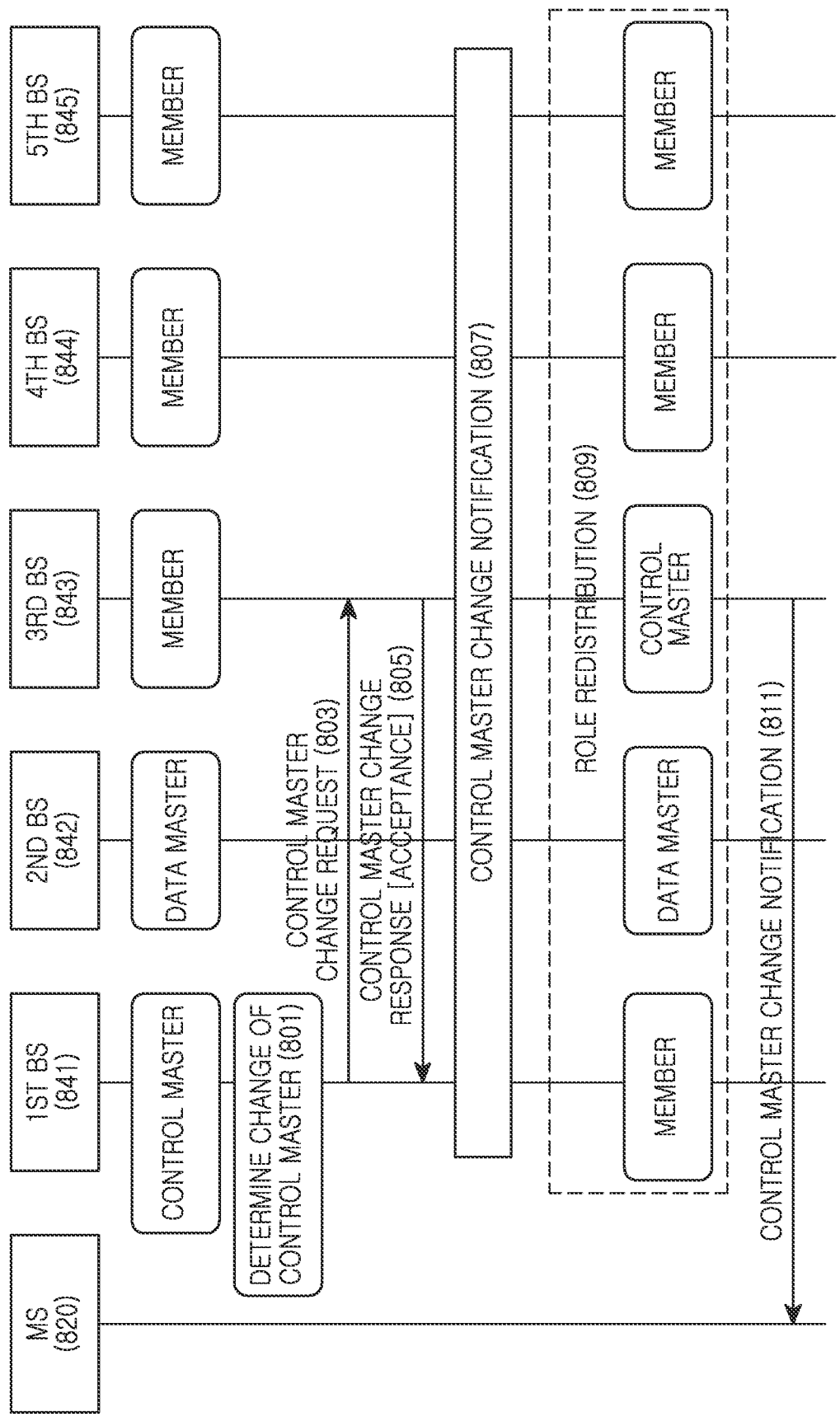
FIG. 8 is a flow diagram illustrating a signal exchange for a control master change in a wireless communication system according to an embodiment of the present disclosure.

FIG. 8 is a flow diagram illustrating a signal exchange for control master change in a wireless communication system according to another embodiment of the present disclosure. FIG. 8 illustrates an embodiment in which a control master and a data master belong to different BSs.

Referring to FIG. 8, a first BS 841, a second BS 842, a third BS 843, a fourth BS 844, and a fifth BS 845 construct a BS set. At this time, the first BS 841 functions as the control master, and the second BS 842 functions as the data master, and the third BS 843, the fourth BS 844, and the fifth BS 845 function as members.

In operation 801, the first BS 841 determines the change of the control master. As described above, the first BS 841 can determine the change of the control master based on at least one of whether a link quality between the first BS 841 and an MS 820 is less than a threshold value, and the overload or non-overload of the first BS 841 as the control master. In addition, the first BS 841 selects one of the member BSs as a new control master BS. At this time, the present disclosure assumes that the third BS 843 is selected as the new control master BS.

In operation 803, the first BS 841 sends a control master change request message to the third BS 843. In operation 805, the third BS 843 sends the first BS 841 a control master change response message accepting a control master change request. However, according to another embodiment of the present disclosure, the third BS 843 can send the first BS 841 a control master change response message refusing the control master change request. For example, the third BS 843 can determine if the third BS 843 itself is suitable as the control master according to a reference for control master selection and, when it is determined that the third BS 843 itself is not suitable as the control master, the third BS 843 can send the first BS 841 the control master change response message refusing the control master change request. For example, the reference for the control master selection can include at least one of a link quality between the third BS 843 and the MS 820, and the overload or non-overload of the third BS 843 as the control master.

In operation 807, the first BS 841 sends a control master change notification to all the other BSs 842 to 845 within the BS set. Accordingly, in operation 809, all the BSs 841, 842, 843, 844, and 845 within the BS set recognize that a role of each BS is redistributed. As a result, the second BS 842 functions as the data master, and the third BS 843 functions as the control master, and the first BS 841, the fourth BS 844, and the fifth BS 845 function as the members. Thereafter, in operation 811, the third BS 843 having become the new control master sends the control master change notification to the MS 820. The data master change procedure is given below.

Prior to the data master change procedure, the control master and the data master belong to different BSs, and the data master BS sends a specific report for determining the data master change to the control master BS. If the control master BS determines to move the data master function to the control master BS, the control master BS sends a data master change request to the data master BS, and the data master function is moved to the control master BS. If the data master is changed, a data master change notification is sent to all BSs within the BS set. Thereafter, IP mobility between the previous data master and the new data master can be carried out through an MIP or a PMIP or the like. After the change of the data master, the control master and the data master all belong to one BS, and the previous data master BS can be removed from the BS set. Because the data master change procedure has no influence on the MS, the data master change is not necessarily notified to the MS. The MS can be aware of only the control master playing a role of a gate exchanging control information. A data master change procedure is described below with reference to the drawings.

Figure 9:
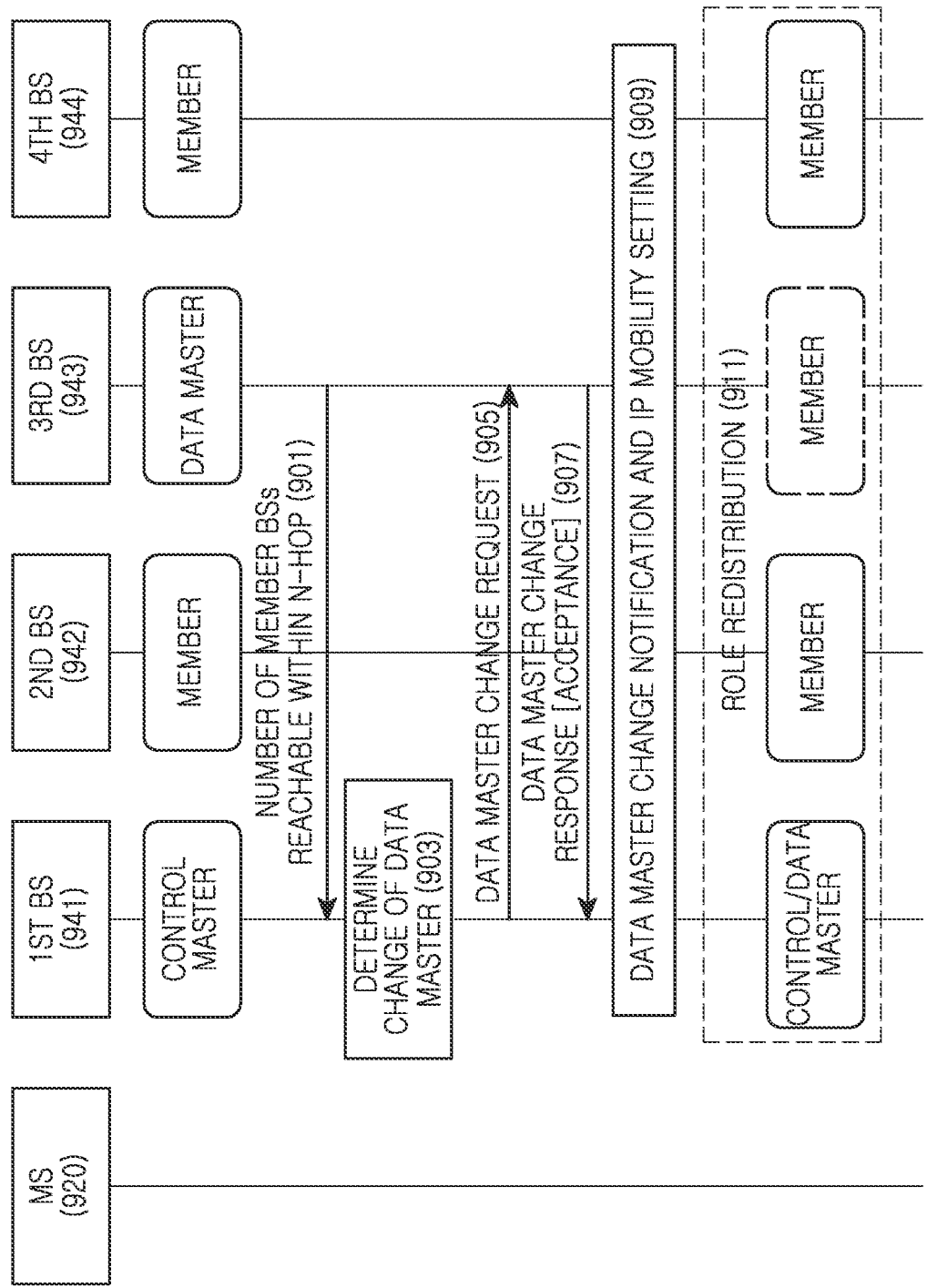
FIG. 9 is a flow diagram illustrating a signal exchange for a data master change in a wireless communication system according to an embodiment of the present disclosure.

FIG. 9 is a flow diagram illustrating a signal exchange for a data master change in a wireless communication system according to an embodiment of the present disclosure.

Referring to FIG. 9, an MS 920 is provided along with a first BS 941, a second BS 942, a third BS 943, and a fourth BS 944, which construct a BS set. At this time, the first BS 941 functions as a control master, the third BS 943 functions as a data master, and the second BS 942 and the fourth BS 944 function as members.

In operation 901, the third BS 943 reports the number of member BSs reachable within N-hop, to the first BS 941. The variable 'N' is an integer of '1' or more, and is a threshold value for determining if the change of the data master is needed. In addition, although not illustrated in FIG. 9, the third BS 943 can further report the existence or non-existence of an active session to the first BS 941. Thereafter, in operation 903, the first BS 941 determines the change of the data master. As above, the first BS 941 determines the change of the data master based on at least one of whether the control master and the data master belong to different BSs, and all active sessions have ended, whether the data master and the control master are a greater distance than N-hop, and whether the number of member BSs reachable by N-hop is less than 'M'.

In operation 905, the first BS 941 sends a data master change request message to the third BS 943. In operation 907, the third BS 943 sends the first BS 941 a data master change response message accepting a data master change request. Thereafter, in operation 909, the first BS 941 sends a data master change notification to all the other BSs 942 to 944 within the BS set, and performs an IP mobility setting procedure. Accordingly, in operation 911, all the BSs 941, 942, 943, and 944 within the BS set recognize that a role of each BS is redistributed. As a result, the first BS 941 functions as a control master and data master, and the second BS 942 and the fourth BS 944 function as members. The third BS 943 being the previous data master functions as a member, or can be excluded from the BS set.

The following embodiment of the present disclosure describes an operation and construction of a BS for managing mobility as described above with reference to the drawings.

Figure 10:
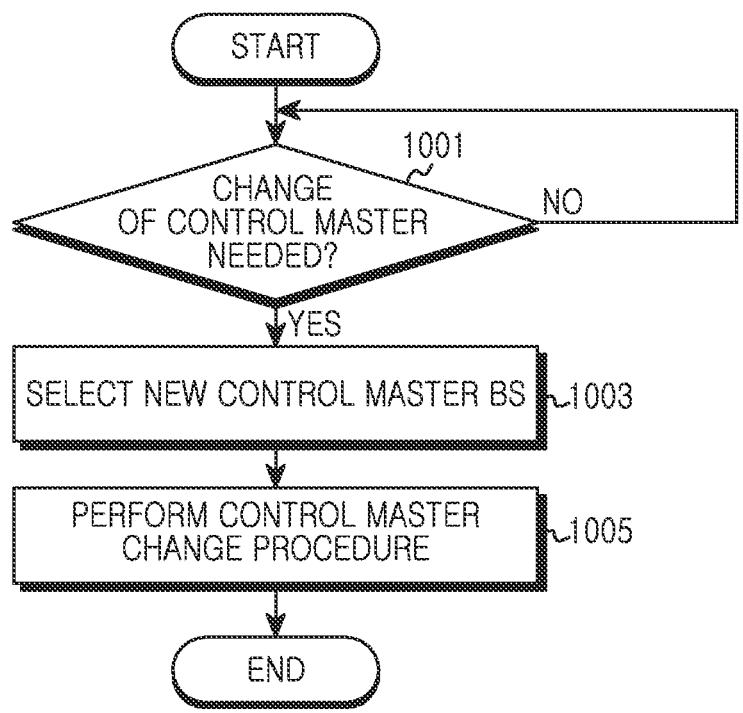
FIG. 10 is a flowchart illustrating an operation of a Base Station (BS) transferring a control master in a wireless communication system according to an embodiment of the present disclosure.

FIG. 10 is a flowchart illustrating an operation of a BS transferring a control master in a wireless communication system according to an embodiment of the present disclosure. In this case, the BS is one of a BS set, and is a control master BS of the BS set.

Referring to FIG. 10, in operation 1001, the BS determines if the change of the control master is needed. The BS determines the change or non-change of the control master based on indexes. For example, the BS can determine the change of the control master based on at least one of whether a link quality between the BS and an MS is less than a threshold value, and the overload or non-overload of the BS as the control master.

If it is determined that the change of the control master is needed, the BS proceeds to operation 1003 and selects one of the other BSs within the BS set as a new control master BS. For example, the BS selects the new control master BS based on at least one of the link quality between each of the other BSs and the MS, whether the other BSs are control master BSs of other BS sets, and load statuses of the other BSs as control masters.

Thereafter, the BS proceeds to operation 1005 and performs a control master change procedure. In other words, the BS sends a message requesting a control master change to the new control master BS, and receives a response message accepting the control master change from the new control master BS. Thereafter, the BS releases the control master function. Additionally, although not illustrated in FIG. 10, the BS can further perform an operation of transmitting information used for the new control master BS to perform the control master function, to the new control master BS.

Figure 11:
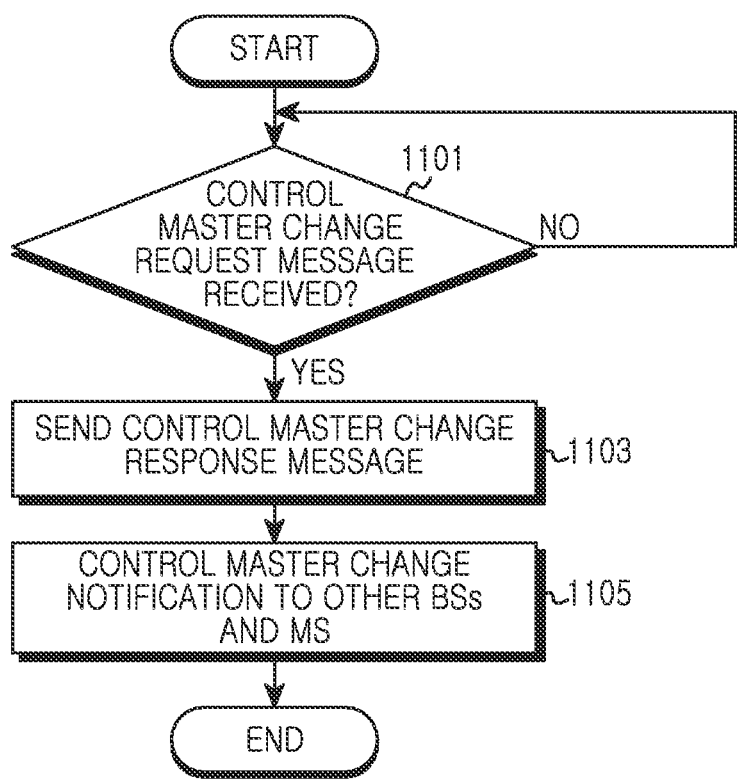
FIG. 11 is a flowchart illustrating an operation of a BS receiving a transfer of a control master in a wireless communication system according to an embodiment of the present disclosure.

FIG. 11 is a flowchart illustrating an operation of a BS receiving a transfer of a control master in a wireless communication system according to an embodiment of the present disclosure. In this case, the BS is one of a BS set, and is a BS not functioning as the control master of the BS set.

Referring to FIG. 11, in operation 1101, the BS determines if a request message is received. The request message is a message requesting a current control master BS to transfer a control master function to the BS.

If the request message is received, the BS proceeds to operation 1103 and sends a response message accepting the control master change, to the current control master BS. Additionally, although not illustrated in FIG. 11, the BS can further perform an operation of receiving information used for performing the control master function from the current control master BS.

Thereafter, the BS proceeds to operation 1105 and sends a control master change notification to other BSs within the BS set and an MS. In other words, the BS sends the other BSs and the MS a message notifying the other BSs and the MS of the control master change. Accordingly, the other BSs within the BS set and the MS recognize that the BS functions as a new control master.

Figure 12:
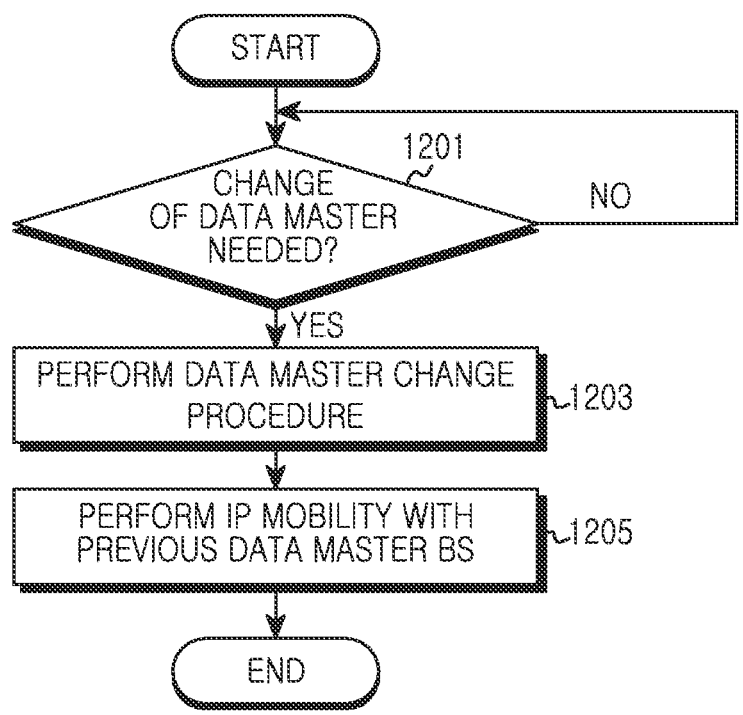
FIG. 12 is a flowchart illustrating an operation of a BS receiving a transfer of a data master in a wireless communication system according to an embodiment of the present disclosure.

FIG. 12 is a flowchart illustrating an operation of a BS receiving a transfer of a data master in a wireless communication system according to an embodiment of the present disclosure. In this case, the BS is one of a BS set, and is a control master BS of the BS set.

Referring to FIG. 12, in operation 1201, the BS determines if the change of the data master is needed based on indexes. For example, the BS can determine the change of the data master based on at least one of whether a control master and the data master belong to different BSs, whether all active sessions have ended, whether the number of hops between the data master and the control master exceeds 'N', and whether the number of member BSs reachable by N-hop is less than 'M'. At this time, a new data master BS is the BS that is the current control master BS.

Although not illustrated in FIG. 12, prior to determining the change or non-change of the data master, the BS can receive information used for determining the change or non-change of the data master, from a data master BS. For example, the BS can receive at least one of the existence or non-existence of an active session, and the number of member BSs reachable by N-hop, from the data master BS.

If it is determined that the change of the data master is needed, the BS proceeds to operation 1203 and performs a data master change procedure. In other words, the BS sends a current data master BS a request message requesting the data master change, and receives a response message accepting the data master change from the current data master BS. Moreover, the BS sends a notification of notifying the other BSs within the BS set that the BS itself is the new data master BS. Additionally, although not illustrated in FIG. 12, the BS can further perform an operation of receiving information used for performing the data master function from the previous data master BS.

Thereafter, the BS proceeds to operation 1205 and performs an IP mobility procedure with the previous data master BS. The IP mobility is for providing a continuity of service by maintaining the session despite the change of an IP endpoint. More specifically, as the IP mobility, an MIP technique, a PMIP technique, and the like, can be applied. For example, the BS being the new data master BS sets an L3 tunnel with the previous data master BS, and relays uplink and downlink data of an MS transmitted/received through the previous data master BS. However, before the data master change, if the MS does not have an active session, operation 1205 can be omitted.

FIG. 12 illustrates an operation of a current control master BS for changing a data master. For example, it is desirable that the procedure illustrated in FIG. 12 is carried out only when the data master and the control master belong to different BSs. Accordingly, if the data master and the control master belong to the same BS, the BS may not perform the procedure of FIG. 12. Alternatively, if the data master and the control master belong to the same BS, the BS performs the procedure illustrated in FIG. 12 but can determine in operation 1201 that the change of the data master is not needed.

Figure 13:
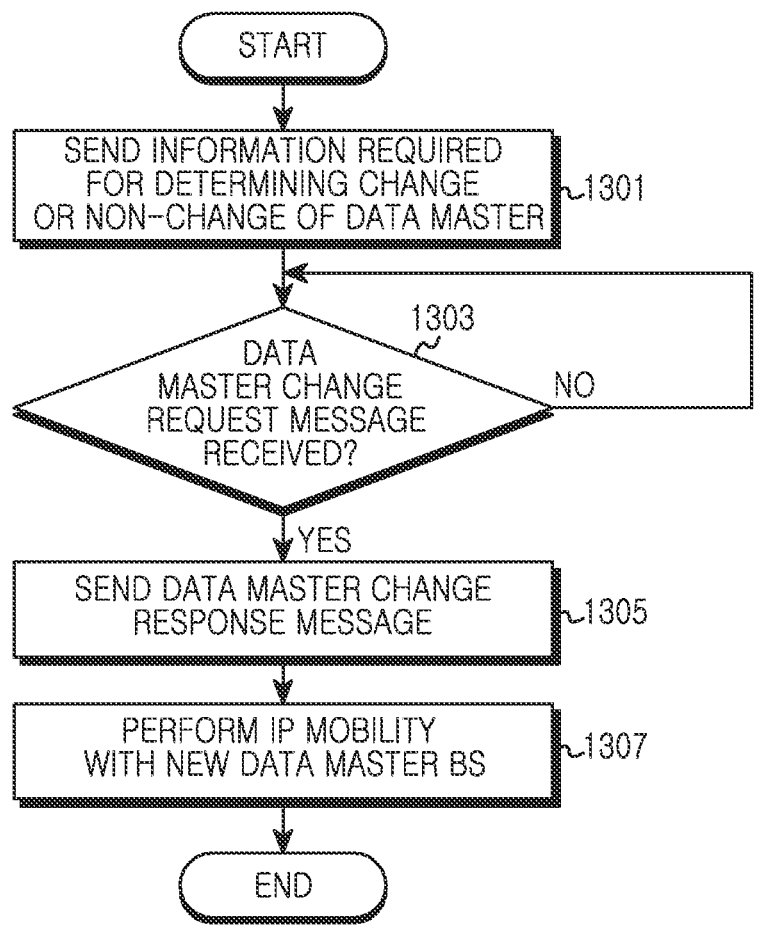
FIG. 13 is a flowchart illustrating an operation of a BS transferring a data master in a wireless communication system according to an embodiment of the present disclosure.

FIG. 13 is a flowchart illustrating an operation of a BS transferring a data master in a wireless communication system according to an embodiment of the present disclosure. In this case, the BS is a data master BS not having a control master function of the BS set.

Referring to FIG. 13, in operation 1301, the BS transmits information used for determining the change or non-change of the data master, to a control master BS. The information used for determining the change or non-change of the data master can vary according to which indexes are used for determining the change or non-change of the data master. For example, the BS can transmit at least one of the existence or non-existence of an active session, and the number of member BSs reachable by N-hop, to the control master BS.

Thereafter, the BS proceeds to operation 1303 and determines if a request message is received. The request message is received from the control master BS and is a message requesting transfer of a data master function to the control master BS.

If the request message is received, the BS proceeds to operation 1305 and sends a response message accepting the data master change. The response message is sent to the control master BS. Thereafter, although not illustrated in FIG. 13, the BS can receive a message notifying that the control master BS is a new data master BS, from the control master BS. Additionally, although not illustrated in FIG. 13, the BS can further perform an operation of transmitting information used for performing the data master function, to the control master BS.

Thereafter, the BS proceeds to operation 1307 and performs an IP mobility procedure with the new data master BS. The IP mobility is for providing a continuity of service by maintaining the session despite the change of an IP endpoint. More specifically, as the IP mobility, an MIP technique, a PMIP technique and the like can be applied. For example, the BS sets an L3 tunnel with the new data master BS, and transmits/receives uplink and downlink data of an MS with the MS through the new data master BS. However, before the data master change, if the MS does not have an active session, operation 1307 can be omitted.

Figure 14:
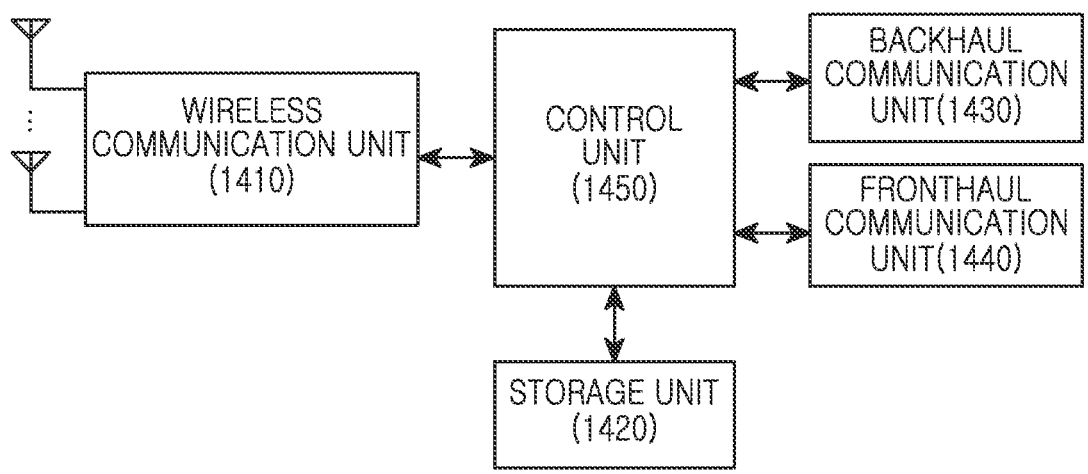
FIG. 14 is a block diagram illustrating a construction of a BS in a wireless communication system according to an embodiment of the present disclosure.

FIG. 14 is a block diagram illustrating a construction of a BS in a wireless communication system according to an embodiment of the present disclosure.

Referring to FIG. 14, the BS includes a wireless communication unit 1410, a storage unit 1420, a backhaul communication unit 1430, a fronthaul communication unit 1440, and a control unit 1450.

The wireless communication unit 1410 provides an interface for performing communication with an MS through a wireless channel. More specifically, the wireless communication unit 1410 includes a MOdulator/DEModulator (MODEM) and a Radio Frequency (RF) processing unit, and can further include a beamforming device. In addition, the wireless communication unit 1410 can further include a cooperative transmission/reception processing device for supporting a BS set.

The modem performs a function of conversion between a baseband signal and a bit stream according to a physical layer standard of the system. For example, in a case of an Orthogonal Frequency Division Multiplexing (OFDM) scheme, at data transmission, the modem generates complex symbols by encoding and modulating a transmission bit stream, maps the complex symbols to subcarriers, and configures OFDM symbols through Inverse Fast Fourier Transform (IFFT) operation and Cyclic Prefix (CP) insertion. In addition, at data reception, the modem splits a baseband signal in an OFDM symbol unit, restores signals mapped to subcarriers through Fast Fourier Transform (FFT) operation, and restores a reception bit stream through demodulation and decoding.

The RF processing unit performs a function for transmitting/receiving a signal through a wireless channel, such as a signal band conversion, an amplification, and the like. For example, the RF processing unit up-converts a baseband signal provided from the modem into an RF band signal, transmits the RF band signal through an antenna, and down-converts an RF band signal received through the antenna into a baseband signal. For example, the RF processing unit can include an amplifier, a mixer, an oscillator, a Digital-to-Analog Converter (DAC), an Analog-to-Digital Converter (ADC), and the like. The RF processing unit can include a plurality of physical devices.

The beamforming device controls a gain according to the directivity of a transmission/reception signal. The beamforming device can perform digital beamforming or analog beamforming according to a time point at which beamforming is performed. A difference between the digital beamforming and the analog beamforming is whether a beamforming parameter for determining a beam direction is determined before the DAC or is determined after the DAC. Accordingly, the beamforming device and the RF processing unit including the DAC can be constructed as one physical block. For example, at signal transmission, in a case of the analog beamforming, the beamforming device multiplies the beamforming parameter after the DAC, thereby controlling a magnitude or phase of each signal to be transmitted through each antenna. At signal transmission, in a case of the digital beamforming, the beamforming device multiplies the beamforming parameter before the DAC, thereby controlling a magnitude or phase of each signal to be transmitted.

The cooperative transmission/reception processing device is one member constructing a BS set, and takes charge of signal processing for performing communication with one MS. For example, the cooperative transmission/reception processing device performs processing (e.g., codebook multiplication, weight multiplication, and the like) of at least one signal stream allocated to the BS, according to a virtual MIMO channel formed between the one MS and a plurality of BSs constructing the BS set.

The storage unit 1420 stores data, such as a basic program for an operation of the BS, an application program, setting information, and the like. More particularly, the storage unit 1420 can store program codes for functioning as a control master and data master. In addition, the storage unit 1420 can store link quality information fed back from the MS or link quality information measured by the BS. In addition, the storage unit 1420 can store information about BS set construction.

The backhaul communication unit 1430 provides an interface for connecting to the Internet. For example, the backhaul communication unit 1430 converts a bit stream transmitted to the Internet into a physical signal, and converts a physical signal received from the Internet into a bit stream. The fronthaul communication unit 1440 provides an interface for performing communication with other BSs. The fronthaul communication unit 1440 can provide a wired or a wireless interface. In a case where the fronthaul communication unit 1440 provides the wireless interface, the fronthaul communication unit 1440 can be either a part of the wireless communication unit 1410 or an independent device. In addition, in a case where the fronthaul communication unit 1440 provides the wired interface, the fronthaul communication unit 1440 can be either a part of the backhaul communication unit 1430 or an independent device.

The control unit 1450 controls general operations of the BS. For example, the control unit 1450 transmits/receives a signal through the wireless communication unit 1410, the backhaul communication unit 1430, and the fronthaul communication unit 1440. In addition, the control unit 1450 records data in the storage unit 1420 and reads the data from the storage unit 1420. The control unit 1450 can include at least one processor for executing the program codes stored in the storage unit 1420, or include a processor for performing a function. According to an embodiment of the present disclosure, the control unit 1450 controls functions for managing mobility within a network where a control master and a data master operate as separated objects. For example, the control unit 1450 controls the BS to operate like a BS illustrated in FIG. 3, FIG. 4, FIG. 7, FIG. 8, or FIG. 9. An operation of the control unit 1450 for transferring a control master at control master change is given below.

In this case, the BS is a control master BS, and the control unit 1450 determines the change of the control master based on at least one of whether a link quality between the BS and an MS is less than a threshold value, and the overload or non-overload of the BS as the control master. If it is determined that the change of the control master is needed, the control unit 1450 selects a new control master BS based on at least one of a link quality between each of other BSs and the MS, whether the other BSs are control master BSs of other BS sets, and load statuses of the other BSs as control masters. Moreover, the control unit 1450 performs a control master change procedure. In other words, the control unit 1450 controls to send a message requesting a control master change to the new control master BS, and receive a response message accepting the control master change from the new control master BS. Furthermore, the control unit 1450 releases the control master function. Additionally, the control unit 1450 can further perform an operation of transmitting information used for the new control master BS to perform the control master function, to the new control master BS. An operation of the control unit 1450 for receiving a transfer of a control master is given below.

In this case, the BS is a BS not functioning as the control master and, if a message requesting to receive a transfer of a control master function is received from a current control master BS, the control unit 1450 sends a response message accepting the control master change, to the current control master BS. Additionally, the control unit 1450 can further perform an operation of receiving information used for performing the control master function from the current control master BS. Thereafter, the control unit 1450 sends a control master change notification to other BSs within a BS set and an MS. An operation of the control unit 1450 for receiving a transfer of a data master is given below.

In this case, the BS is a control master BS, and the control unit 1450 determines the change of the data master based on at least one of whether a control master and the data master belong to different BSs, whether all active sessions have ended, whether the number of hops between the data master and the control master exceeds 'N', and whether the number of member BSs reachable by N-hop is less than 'M'. At this time, a new data master BS is the BS that is the current control master BS. In addition, prior to determining the change or non-change of the data master, the control unit 1450 can receive information used for determining the change or non-change of the data master, from a data master BS. If it is determined that the change of the data master is needed, the control unit 1450 performs a data master change procedure. In other words, the control unit 1450 controls to send a current data master BS a message requesting the data master change, and receive a response message accepting the data master change from the current data master BS. Moreover, the control unit 1450 sends a notification to other BSs within the BS set that the BS itself is the new data master BS. Additionally, the control unit 1450 can further perform an operation of receiving information used for performing the data master function from the previous data master BS. Thereafter, the control unit 1450 performs an IP mobility procedure with the previous data master BS. However, before the data master change, if the MS does not have an active session, the IP mobility procedure can be omitted. An operation of the control unit 1450 for transferring a data master is given below.

In this case, the BS is a data master BS not having a control master function. The control unit 1450 transmits information used for determining the change or non-change of the data master, to a control master BS. Thereafter, if a message requesting a data master change is received, the control unit 1450 sends a response message accepting the data master change. Thereafter, the control unit 1450 receives a message notifying that the control master BS is a new data master BS, from the control master BS. Additionally, the control unit 1450 can further perform an operation of transmitting information used for performing the data master function, to the control master BS. Thereafter, the control unit 1450 performs an IP mobility procedure with the new data master BS. However, before the data master change, if the MS does not have an active session, the IP mobility procedure can be omitted.

As described above, various embodiments of the present disclosure can reduce the frequency of occurrence of an IP mobility event even if a BS performing a control signaling function is changed according to the movement of an MS, by independently managing the control signaling function and a data flow management function within a BS set in which a plurality of BSs cooperatively operate in a wireless communication system.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating a first base station (BS) in a wireless communication system, the method comprising:
   performing a scheduling for first data communication between a mobile station (MS) and a BS set;
   transmitting, to the MS and the BS set, a scheduling message comprising information of the scheduling for the first data communication;
   transmitting, to a second BS included in the BS set, a request message for requesting the second BS to transmit/receive a control message related to the MS;
   receiving, from the second BS, a response message in response to the request message;
   receiving, from the second BS, the control message related to the MS;
   performing a scheduling for second data communication between the MS and the BS set based on the control message related to the MS; and
   transmitting, to the BS set, a scheduling message comprising information of the scheduling for the second data communication,
   wherein the first BS and the second BS are included in the BS set to cooperatively serve the MS.

2. The method of claim 1, wherein the request message is transmitted in response to satisfying a condition that is defined based on at least one of whether a link quality between the first BS and the MS is less than a threshold, and whether the first BS is overloaded.

3. The method of claim 1, further comprising determining the second BS based on at least one of a link quality between each of the other BSs included in the BS set and a number of hops with the first BS.

4. The method of claim 3, further comprising:
notifying, to other BSs included in the BS set, that the second BS is to transmit the control message related to the MS.

5. The method of claim 1, wherein the performing the scheduling for the second data communication comprising:
receiving downlink data for the MS; and
distributing the downlink data to other BSs included in the BS set,
wherein the first BS operates as an internet protocol (IP) endpoint of the MS, included in the BS set.

6. The method of claim 1, further comprising managing other BS included in the BS set based on a channel quality indicator (CQI) report from the MS, before transmitting the request message.

7. A method for operating a first base station (BS) in a wireless communication system, the method comprising:
receiving, from a second BS included in a BS set, a scheduling message comprising information of a scheduling for first data communication between a mobile station (MS) and a BS set;
transmitting, to the MS, the scheduling message comprising information of the scheduling for the first data communication;
transmitting, to the second BS, a request message for requesting that the first BS performs a scheduling for second data communication between the MS and the BS set;
receiving, from the second BS, a response message for responding to the request message;
performing the scheduling for the second data communication between the MS and the BS set1; and
transmitting, to the MS and BS set, a scheduling message comprising the information of the scheduling for the second data communication,
wherein the first BS and the second BS are included in the BS set to cooperatively serve the MS.

8. The method of claim 7, further comprising:
notifying, to other BSs included in the BS set, that the first BS perform the scheduling for the second data communication; and
performing internet protocol (IP) mobility with the second BS.

9. The method of claim 7, further comprising:
generating a layer 3 (L3) tunnel with the second BS; and
relaying uplink data and downlink data for the MS, between the MS and the second BS through the L3 tunnel.

10. The method of claim 7, further comprising managing other BSs included the BS set based on a channel quality indicator (CQI) report from the MS, before transmitting the request message.

11. An apparatus for a first base station (BS) in a wireless communication system, the apparatus comprising:
at least one transceiver; and
at least one processor operatively coupled to the at least one transceiver,
wherein the at least one processor is configured to control to:
perform a scheduling for first data communication between a mobile station (MS) and a BS set,
transmit, to the MS, a scheduling message comprising information of the scheduling for the first data communication,
transmit, to a second BS included in the BS set, a request message for requesting the second BS transmit/receive a control massage related to the MS,
receive, from the second BS, a response message in response to the request message,
receive, from the second BS, the control message related to the MS,
perform a scheduling for second data communication between the MS and the BS set based on the control message related to the MS, and
transmit, to the BS set, a scheduling message comprising information of the scheduling for the second data communication,
wherein the first BS and the second BS are included in the BS set to cooperatively serve the MS.

12. The apparatus of claim 11, wherein the request message is transmitted in response to satisfying a condition that is defined based on at least one of whether a link quality between the BS and the MS is less than a threshold, and whether the first BS is overloaded.

13. The apparatus of claim 11,
wherein the at least one processor is further configured to control to determine the second BS based on at least one of a link quality between each of the plurality of BSs included in the BS set and the MS and a number of hops with the first BS.

14. The apparatus of claim 13, wherein the at least one processor is further configured to control to notify, to other BSs included in the BS set, the second BS is to transmit the control message related to the MS.

15. The apparatus of claim 11,
wherein, the at least one processor is further configured to control to:
receive downlink data for the MS,
distribute the downlink data to other BSs included in the BS set, and
operate as an internet protocol (IP) endpoint of the MS, included in the BS set.

16. The apparatus of claim 11, wherein the at least one processor is further configured to control to manage other BSs included in the BS set based on a channel quality indicator (CQI) report from the MS, before transmitting the request message.

17. An apparatus for a first base station (BS) in a wireless communication system, the apparatus comprising:
at least one transceiver; and
at least one processor operatively coupled to the at least one transceiver;
wherein the at least one processor is configured to control to:
receive, from second BS in a BS set, a scheduling message comprising information of a scheduling for first data communication between a mobile station (MS) and a BS set,
transmit, to the MS, the scheduling message comprising information of the scheduling for the first data communication,
transmit, to a second BS, a request message for requesting to that the first BS performs a scheduling for second data communication between the MS and the BS set,
receive, from the second BS, a response message for responding to the request message,
perform the scheduling for the second data communication between the MS and the BS set, and transmit, to the MS, a scheduling message comprising the information of the scheduling for the second data communication, wherein the first BS and the second BS are included in the BS set to cooperatively serve the MS.

18. The apparatus of claim 17, wherein the at least one processor is further configured to control to:

notify, to other BSs included in the BS set, that the first BS is to perform the scheduling for the second data communication, and perform interne protocol (IP) mobility with the second BS.

19. The apparatus of claim 17, wherein the at least one processor is further configured to control to:

generate a Layer 3 (L3) tunnel with the second BS, and relay uplink data and downlink data for the MS, between the MS and the second BS through the L3 tunnel.

20. The apparatus of claim 17, wherein the at least one processor is further configured to control to manage other BS included in the BS set based on a channel quality indicator (CQI) report from the MS, before transmitting the request message.

* * * * *